US009448682B2

(12) United States Patent
Yerli

(10) Patent No.: US 9,448,682 B2
(45) Date of Patent: Sep. 20, 2016

(54) SELECTIVELY DISPLAYING CONTENT TO A USER OF A SOCIAL NETWORK

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 198 days.

(21) Appl. No.: 13/719,132

(22) Filed: Dec. 18, 2012

(65) Prior Publication Data
US 2013/0159885 A1 Jun. 20, 2013

Related U.S. Application Data

(60) Provisional application No. 61/577,418, filed on Dec. 19, 2011.

(51) Int. Cl.
| | |
|---|---|
| *G06F 3/0482* | (2013.01) |
| *G06F 3/048* | (2013.01) |
| *G06Q 10/10* | (2012.01) |
| *G06Q 30/02* | (2012.01) |
| *G06Q 50/00* | (2012.01) |
| *H04L 29/08* | (2006.01) |

(52) U.S. Cl.
CPC ............ *G06F 3/048* (2013.01); *G06F 3/0482* (2013.01); *G06Q 10/10* (2013.01); *G06Q 30/0255* (2013.01); *G06Q 50/01* (2013.01); *H04L 67/02* (2013.01)

(58) Field of Classification Search
CPC ............................. G06F 3/048; G06F 3/0482
USPC ....................................................... 715/753
See application file for complete search history.

(56) References Cited

U.S. PATENT DOCUMENTS

| | | | |
|---|---|---|---|
| 5,754,939 A | 5/1998 | Herz | |
| 6,865,746 B1 * | 3/2005 | Herrington | ........ H04N 5/44543 348/E5.105 |

(Continued)

FOREIGN PATENT DOCUMENTS

| | | |
|---|---|---|
| CN | 1708986 A | 12/2005 |
| CN | 101366029 A | 2/2009 |

(Continued)

OTHER PUBLICATIONS

Eldon, E., "Facebook Rearranges Events Page To Be More Like Other Pages," Jul. 16, 2010, <http://www.insidefacebook.com/2010/07/16/facebook-rearranges-events-page-to-be-more-like-other-pages/> [retrieved Jul. 31, 2014], 3 pages.

(Continued)

*Primary Examiner* — Reza Nabi
*Assistant Examiner* — Daniel Rodriguez
(74) *Attorney, Agent, or Firm* — Christensen O'Connor Johnson Kindness PLLC

(57) ABSTRACT

A computer-implemented method for selectively displaying a content to a user of a social network, including maintaining in a computer system for each user of the social network a profile including data on individual preferences and/or interests of the user and the significance of each preference and/or interest for the user; providing input data including content; receiving a request of the user for displaying content; and selectively displaying filtered content to the user in response to the request, in which the filtered content is displayed in accordance with the profile of the user.

19 Claims, 12 Drawing Sheets

(56) References Cited

U.S. PATENT DOCUMENTS

| | | | |
|---|---|---|---|
| 7,669,123 B2 | 2/2010 | Zuckerberg | |
| 7,822,745 B2 | 10/2010 | Fayyad | |
| 7,827,208 B2 | 11/2010 | Bosworth | |
| 7,930,629 B2* | 4/2011 | Hurst-Hiller | G06F 17/30893 709/248 |
| 8,086,504 B1* | 12/2011 | Dicker | G06Q 30/0641 705/27.1 |
| 8,170,916 B1* | 5/2012 | Dicker | G06Q 30/0601 705/26.1 |
| 8,224,851 B2* | 7/2012 | Banda et al. | 707/781 |
| 8,271,266 B2 | 9/2012 | Gallagher | |
| 8,375,068 B1 | 2/2013 | Platt | |
| 8,606,872 B1 | 12/2013 | Reitnour | |
| 2002/0078056 A1* | 6/2002 | Hunt | G06F 17/30867 |
| 2005/0198031 A1 | 9/2005 | Pezaris | |
| 2006/0100987 A1* | 5/2006 | Leurs | H04N 5/44543 |
| 2007/0016609 A1 | 1/2007 | Kim | |
| 2007/0083536 A1 | 4/2007 | Darnell | |
| 2007/0132767 A1 | 6/2007 | Wright | |
| 2007/0174247 A1* | 7/2007 | Xu et al. | 707/3 |
| 2007/0174389 A1 | 7/2007 | Armstrong | |
| 2007/0214141 A1* | 9/2007 | Sittig | G06Q 10/00 |
| 2008/0034307 A1 | 2/2008 | Cisler | |
| 2008/0046976 A1 | 2/2008 | Zuckerberg | |
| 2008/0077585 A1* | 3/2008 | Li et al. | 707/6 |
| 2008/0183757 A1* | 7/2008 | Dorogusker | G06Q 30/0241 |
| 2008/0294663 A1 | 11/2008 | Heinley | |
| 2009/0006442 A1* | 1/2009 | Anderson et al. | 707/102 |
| 2009/0070412 A1* | 3/2009 | D'Angelo et al. | 709/203 |
| 2009/0094190 A1 | 4/2009 | Stephens | |
| 2009/0171869 A1 | 7/2009 | Liu | |
| 2009/0216569 A1 | 8/2009 | Bonev | |
| 2009/0248486 A1* | 10/2009 | Gupta | G06Q 30/0267 705/14.64 |
| 2009/0248494 A1 | 10/2009 | Hueter | |
| 2009/0319914 A1 | 12/2009 | Roseway | |
| 2010/0049766 A1* | 2/2010 | Sweeney et al. | 707/737 |
| 2010/0088322 A1 | 4/2010 | Chowdhury | |
| 2010/0153848 A1* | 6/2010 | Saha | G06F 17/30884 715/721 |
| 2010/0161619 A1* | 6/2010 | Lamere | G06Q 10/00 707/749 |
| 2010/0161620 A1* | 6/2010 | Lamere | G06F 17/30749 707/749 |
| 2010/0169363 A1* | 7/2010 | Gaedcke | G06F 17/30867 707/769 |
| 2010/0199192 A1 | 8/2010 | Sittig | |
| 2010/0241507 A1* | 9/2010 | Quinn | G06Q 30/02 705/14.42 |
| 2010/0306249 A1 | 12/2010 | Hill | |
| 2011/0004831 A1 | 1/2011 | Steinberg | |
| 2011/0022966 A1* | 1/2011 | Rose | G06F 17/3089 715/747 |
| 2011/0145719 A1* | 6/2011 | Chen et al. | 715/739 |
| 2011/0153377 A1 | 6/2011 | Novikov | |
| 2011/0173198 A1* | 7/2011 | Malleshaiah et al. | 707/737 |
| 2011/0208822 A1* | 8/2011 | Rathod | G06Q 30/02 709/206 |
| 2011/0276372 A1 | 11/2011 | Spivack | |
| 2011/0276396 A1* | 11/2011 | Rathod | G06F 17/30867 705/14.49 |
| 2012/0005209 A1* | 1/2012 | Rinearson | G06F 17/30908 707/737 |
| 2012/0072845 A1* | 3/2012 | John | G06F 17/30038 715/738 |
| 2012/0101806 A1* | 4/2012 | Davis | G06Q 50/01 704/9 |
| 2012/0110052 A1* | 5/2012 | Smarr et al. | 709/201 |
| 2012/0110076 A1* | 5/2012 | Su | G06Q 10/10 709/204 |
| 2012/0110088 A1* | 5/2012 | Su | G06Q 10/10 709/205 |
| 2012/0117094 A1* | 5/2012 | Pratt et al. | 707/758 |
| 2012/0124089 A1* | 5/2012 | Sim | G06Q 30/02 707/776 |
| 2012/0323909 A1* | 12/2012 | Behforooz | G06F 17/3053 707/728 |
| 2013/0007661 A1* | 1/2013 | Klappert et al. | 715/811 |
| 2013/0124504 A1* | 5/2013 | Haugen | G06Q 50/01 707/722 |
| 2013/0159883 A1 | 6/2013 | Yerli | |
| 2013/0159885 A1 | 6/2013 | Yerli | |
| 2013/0173531 A1* | 7/2013 | Rinearson | G06F 17/30011 707/608 |
| 2013/0212192 A1 | 8/2013 | Yerli | |
| 2013/0212491 A1 | 8/2013 | Yerli | |
| 2013/0263018 A1* | 10/2013 | Xiong | H04N 21/458 715/753 |

FOREIGN PATENT DOCUMENTS

| | | |
|---|---|---|
| CN | 103077179 A | 5/2013 |
| WO | 2007/076150 A2 | 7/2007 |
| WO | 2011/011398 A2 | 1/2011 |
| WO | 2011/082496 A1 | 7/2011 |

OTHER PUBLICATIONS

European Search Report mailed Dec. 4, 2012, issued in European Application No. 12 18 3982.3, filed Sep. 12, 2012, 6 pages.

"Index," definition from Merriam-Webster, <http://www.merriam-webster.com/dictionary/index> [retrieved Jul. 31, 2014], 3 pages.

"Timeline," definition from the Free Dictionary, <http://www.thefreedictionary.com/timeline> [retrieved Jul. 31, 2014], 2 pages.

European Search Report mailed Jun. 20, 2013, in European Application No. 12 19 5805.2, filed Dec. 6, 2012, 6 pages.

Office Action mailed Jul. 25, 2014, from U.S. Appl. No. 13/612,773, filed Sep. 12, 2012, 31 pages.

Office Action mailed Aug. 12, 2014, from U.S. Appl. No. 13/612,765, filed Sep. 12, 2012, 24 pages.

First Office Action, mailed Aug. 7, 2015, issued in corresponding Chinese Application No. 201210553726.9, filed Dec. 19, 2012, 17 pages.

First Office Action mailed Apr. 17, 2015, issued in Chinese Application No. 201210336565.8, filed Sep. 12, 2012, 12 pages.

Final Office Action mailed Feb. 5, 2015, from U.S. Appl. No. 13/612,773, filed Sep. 12, 2012, 28 pages.

Office Action mailed Oct. 20, 2015, from U.S. Appl. No. 13/612,765, filed Sep. 12, 2012, 30 pages.

Second Office Action mailed Sep. 29, 2015, issued in Chinese Application No. 201210336565.8, filed Sep. 12, 2012, 19 pages.

* cited by examiner

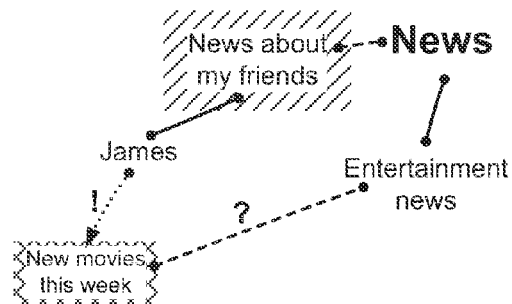

The user's friend James suggested a new keyword to the user "new movies this week" that will link to a portal showing the latest movie schedule.

S 8a

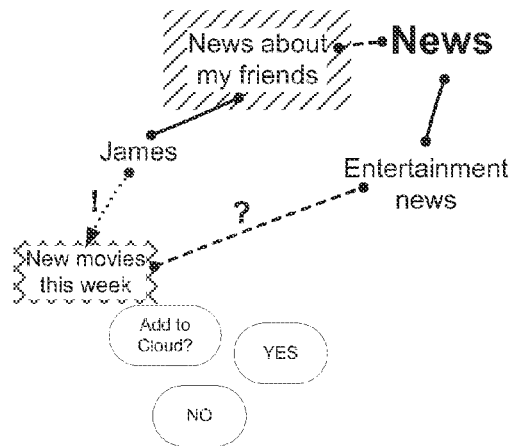

By clicking on the new topic the user can choose to add or delete the link.

S 8b

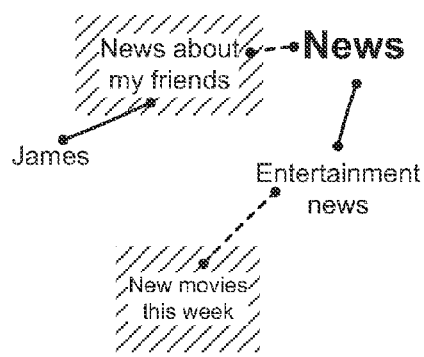

By accepting the new keyword the link to "Entertainment news" is set and the link to James is separated.

S 8c

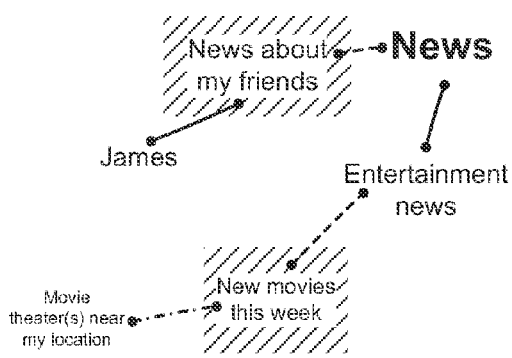

As the user accepted the new keyword the system suggests now a another keyword to connect the user to the nearest movie theater.

SELECTIVELY DISPLAYING CONTENT TO A USER OF A SOCIAL NETWORK

CROSS-REFERENCE TO RELATED APPLICATION

This application claims the benefit of U.S. Provisional Patent Application No. 61/577,418, filed Dec. 19, 2011, the disclosure of which is incorporated by reference herein in its entirety.

This application also relates to U.S. patent application Ser. No. 13/612,765, entitled "Computer-implemented method for displaying an individual timeline of a user of a social network, computer system and computer-readable medium thereof," filed on Sep. 12, 2012, which claims the benefit of U.S. Provisional Application No. 61/533,277, filed on Sep. 12, 2011, entitled "A computer-implemented method for displaying an individual timeline of a user of a social network, computer system and computer readable medium thereof"; and U.S. patent application Ser. No. 13/612,773, entitled "Computer-implemented method for posting messages about future events to users of a social network, computer system and computer-readable medium thereof," filed on Sep. 12, 2012, which claims the benefit of U.S. Provisional Application No. 61/533,279, filed on Sep. 12, 2011, entitled "A computer-implemented method for posting messages about future events to users of a social network, computer system and computer readable medium thereof"; the disclosures of which are incorporated by reference herein in their entirety.

FIELD

The present disclosure relates in general to social networks run in a computer environment and related in particular to methods and systems for selectively displaying content to a registered user (member) of a social network.

BACKGROUND

With the increasing popularity of social networking, traditional forms of joining, sharing interests and hobbies, and making appointments, e.g., by joining social clubs, attending social events, meeting friends through other friends, and so forth, are replaced by social activities via the Internet, in particular, by some sort of social forum for networking and meeting new people. It can even be said that for many people, the Internet nowadays represents the principal way in which the people meet new friends and remain in touch with existing friends, because the Internet enables establishing and maintaining interactions between vast numbers of individuals.

For this purpose, various social networking websites have been developed in recent years. Social networking websites can provide organizational tools and forums for allowing these individuals to interact with one another via the social networking website. Many users prefer to limit communications to specific groups of other users or friends sharing the same or similar interests and activities.

Social network websites also display content to the users in a manner similar to standard portals in the Internet, the content covering potential interests of the users of the social network. Typical websites display their information (content) based on terms the user does not define himself, such as the latest news (based on time), advertisements (based on the interest of advertising companies), or content that is placed on that page by the decision of the hosts.

To run a successful community, the site needs to present all available content in a format that satisfies every user, e.g., the content presented is suited for the user and is very relevant to what the user is looking for in the context the user is in. It can even be said that the success of a social network will depend on the relevance of the content displayed to the respective user. Therefore, there exists a need to selectively display content to the respective user of a social network website in accordance with the preferences and/or interests of the respective user.

According to the prior art, methods for analyzing and categorizing data streams (content) are known.

US 2010/0088322 A1 discloses a method for identifying so-called "hot topics." Whether a topic is hot may be determined based on a change in a volume of search queries related to the topic. For example, if an increase in search query volume is above a particular threshold, the topic related to the search query may be deemed a hot topic.

US 2009/0171869 A1 discloses that one or more future hot terms may be predicted according to a classification process.

US 2007/0016609 A1 relates to tools that can analyze content to determine its traits, classify the content based on its traits, and present the content in a user interface tailored to the classification. The tools can also organize content items into groups based on a common trait and enable a user to select content items through their group. Responsive to the user's selection of a group, the tools can present content, render enclosures, and alter traits of the content items in the group.

US 2009/0319914 A1 discloses a method for determining a relationship between participants in an online community based on various facts. The nature of the relationship is represented in a user interface (UI) by a visual element that shows the extent or depth of the relationship. Facets of the relationship may be used to facilitate interaction between participants (e.g., if two participants both like a particular band, then information relevant to the band may be shown as part of the UI when the participants interact with each other). The nature of the relationship may be determined or characterized based on commonality of activities, commonality of interests, the extent to which the participants have interacted with each other in the past, or other facts.

SUMMARY

The present application is directed to an enhanced method and system for selectively displaying content to a user of a social network, and in particular to methods and systems for selectively displaying content to a registered user (member) of a social network in accordance with selectable, pre-selectable or adjustable settings of the user such as preferences and/or interests, wherein the settings are preferably stored as part of the profile of the user on a central service of the social network. The method and system according to the present application enhances the efficiency to provide relevant content to a user of a social network or online community.

According to the present disclosure, there is provided a computer-implemented method for selectively displaying content to a user of a social network, comprising: maintaining in a computer system for each user of said social network a profile including data on individual preferences and/or interests of the user and the significance of each preference and/or interest for the user; providing input data including content; receiving a request of said user for displaying content; and selectively displaying filtered content to said user in response to said request, wherein said filtered content is displayed in accordance with the profile of said user.

According to an embodiment, the filtered content is displayed in accordance with a list of keywords and in accordance with the individual preferences and/or interests of said user, wherein the list of keywords is stored as part of the profile of said user on a central server of said social network. According to the present disclosure, the content which is selectively displayed to the user is controlled by means of settings stored in the individual profile of the respective user, such as individual preferences and/or interests of the respective user or information encoding such individual preferences and/or interests.

According to a further embodiment, the step of setting said list of keywords, comprises: displaying a graphical representation of said list of keywords on a graphical user interface (GUI) of an electronic device operated by said user, wherein the graphical representation indicates the significance of said keywords and the connection of said keywords with other keywords included in said list of keywords; modifying the significance and/or connection of said keywords in response to input data of said user, such as navigational input data of user navigational interactions on said graphical user interface, to thereby obtain a modified list of keywords including the keywords and the respective significance and/or connection associated with these keywords; and storing said modified list of keywords as part of the profile of said user on a central server of said social network. Hence, the selective filtering of the content displayed to the user is accomplished by means of a graphical representation of the individual preferences and/or interests of the respective user and by means of modifying this graphical representation by means of a suitable user input. That user input may be obtained by means of a classical data input mask for inputting and/or modifying text information. Preferably, however, the user input is derived from user interaction with the graphical user interface by means of a pointing device, such as a mouse, stylus, or finger touch on a touch-sensitive display, said pointing device modifying the position, significance and/or connection of graphical representations of the respective keywords, e.g., by modifying the size or color or other graphical feature of a graphical representation of the respective keywords, wherein the size or color or other graphical feature of a graphical representation encodes the significance (individual weight) of the respective keywords or moving the graphical representation of a keyword to a different location relative to the locations of the other keywords included in the list of keywords, wherein the distance between keywords encodes the connection strength between the keywords involved.

According to another embodiment, the graphical representation of said list of keywords is displayed as a separate window of said GUI upon activation of a menu button of said GUI. Hence, by opening the dedicated window for setting or adjusting the individual list of keywords, the selective filtering of content displayed to the user can be modified in a simple manner transparent to the user.

According to another embodiment, the filtered content is displayed in a central display area of the GUI, wherein the menu button is persistently displayed at a periphery of the central display area of said graphical user interface, wherein, if the dedicated menu button is activated, the graphical representation of the list of keywords is displayed in a separate window of the graphical user interface, and the user can navigate in this separate window for setting or adjusting the individual list of keywords. Preferably, graphical user input and/or gestures are used for the purpose of setting or adjusting the individual list of keywords. According to this embodiment the user can repeatedly change between a window for displaying the graphical representation of the modified list of keywords and the window for displaying the modified filtered content (the main window of the social network website).

DESCRIPTION OF THE DRAWINGS

Hereinafter, the disclosure will be set forth in an exemplary manner and with reference to the enclosed drawings from which further features, advantages and technical effects achieved will become apparent. In the drawings:

FIG. 8 schematically summarizes the steps of modifying a list of keywords (interest cloud) according to another embodiment of the present disclosure;

DETAILED DESCRIPTION

Figure 1:
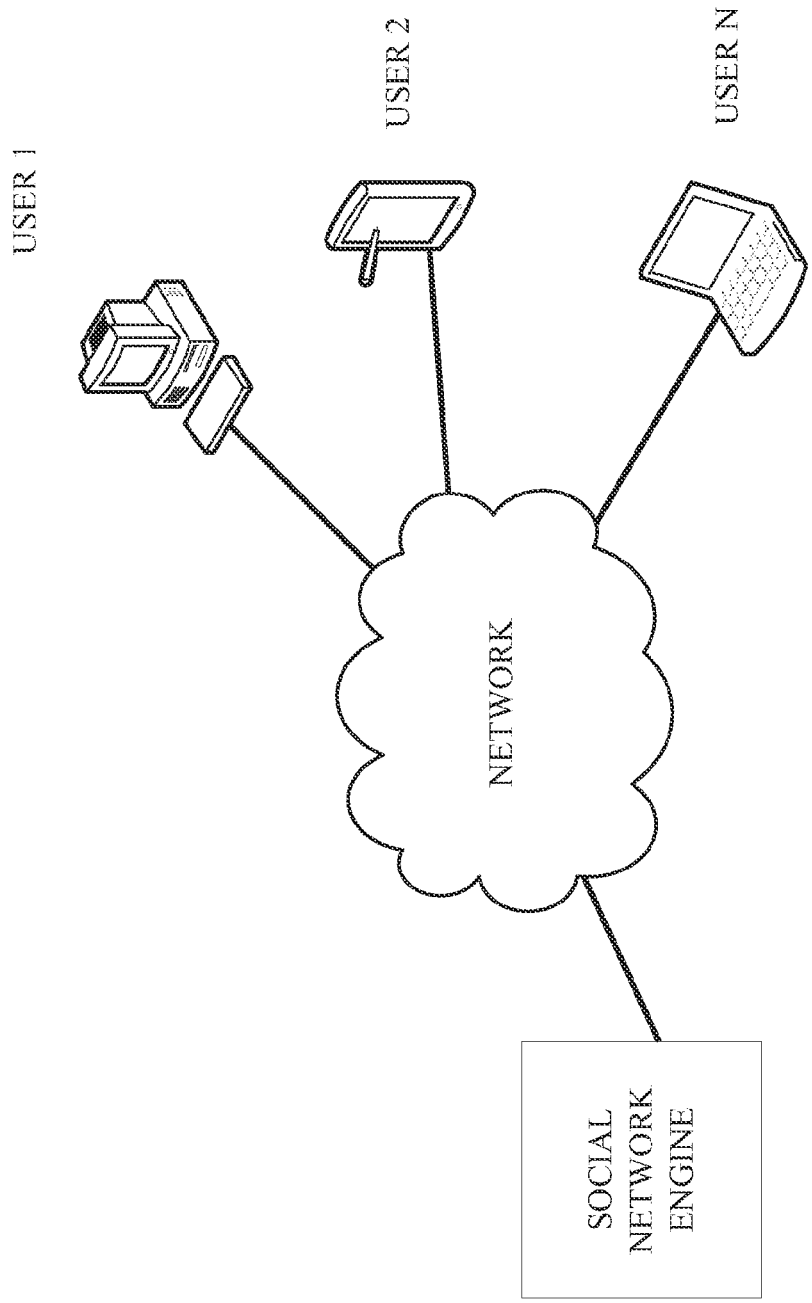
FIG. 1 is a schematic block diagram of an exemplary system environment for implementing a social network.

FIG. 1 is a schematic block diagram of an exemplary system environment for implementing a social network according to the present disclosure. One or more users, user 1, user 2, . . . user N, are in communication with a social network engine via a network. The social network engine operates a social networking website and may include one or more servers or any other device or application capable of providing social networking services via the network. The users can access the services provided by the social network engine via the network.

The users may use a computing device, such as a laptop or desktop computer, a smart phone, a personal digital assistant (PDA), a set top box, and so forth to access the social network engine. The users can view data about social network members, enter data about themselves and possibly others, join social network groups, view content on a GUI, and so forth. The users are typically members of a social networking website associated with the social network engine.

When being connected to the social network, a user, such as the user 1, can identify one or more other members associated with the social network engine as friends, such as user 2. Friends will usually share similar preferences and/or interests and such relationships can be established based on user input, e.g., when a user explicitly appoints another member of the social network as a friend based, e.g., on similar preferences or interests as determined based on individual preferences input by the two users. As an alternative, such relationships can be established based on user interaction with the social network and as a result of a proposal generated automatically by the social network and sent as a message to two users asking them for confirmation whether the respective other user shall be a friend. Such a proposal can be made by the social network engine based on an automatic search in the preferences and/or interests stored in the social network engine for preferences and/or interests of two users matching with each other suitably well.

The relationship between users of the social network may be confirmed, based on the input, by the social network engine. Alternatively, the existence of the relationship may be denied, according to some embodiments. Any type of confirmation and/or input may be utilized to alter, deny, and/or establish the relationship between users.

Figure 2:
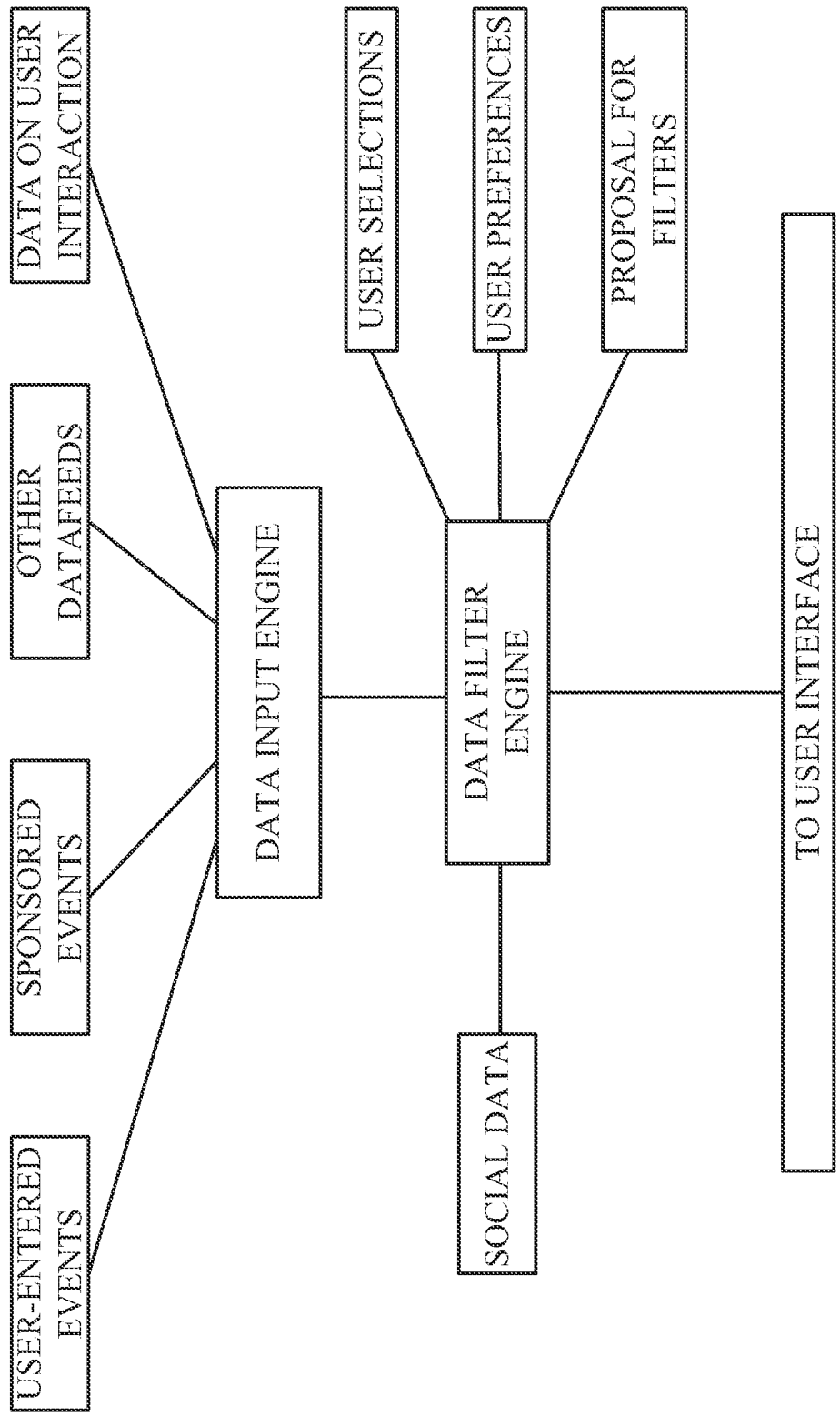
FIG. 2 is a schematic block diagram summarizing the processes of obtaining input data and filtering the input data in accordance with the personal preferences and/or interests of an individual user of the social network according to FIG. 1.

FIG. 2 is a schematic block diagram summarizing the processes of obtaining input data and filtering the input data in accordance with the personal preferences and/or interests of an individual user of the social network according to FIG. 1. All data are input via a data input engine, which can be a component of the aforementioned social network engine. Various types of data input may be provided: a) the data input may include various kinds of data about events explicitly input by the user via a user interface, such as a keyboard, GUI, or interface with other peripheral devices, such as video cameras and the like; b) the data input may also include data on sponsored events, which may be information usually provided by commercial subscribers of the services rendered by the provider of the social network; as an example, a developer or publisher of video games may subscribe to the social network or may be a member of the social network and may feed data to the social network about new games and related information; c) the data input may also include other datafeeds, such as RSS-Feeds; d) the data input may also include data on the interaction of the specific user associated with the timeline to be generated or of all users of the social network or of subgroups of the social network, such as special communities, such data being generated by continuously monitoring and analyzing the user interactions in accordance with search criteria; as an example, the provider of the social network may monitor and analyze, e.g., if the users agree, all interactions of the users of the social network associated with video games and may prepare these data as input data. For this purpose, events, such as when a user decides to watch a trailer of a new video game to be launched soon (e.g., by clicking on an icon or link to the trailer) or decides to play a test version of the new video game, are associated or linked with keywords describing the event (e.g., in the example, the name of the new video game).

All the above input data may be associated with certain keywords describing the event. Such keywords may concisely categorize the content, purpose, place, length, etc., of the event or categorize any action involved in the event. These keywords may be used later for filtering input data (content) and for selectively displaying filtered content on a display of a user.

Of course, instead of or in addition to words, the phrase "keyword" as used herein may involve other kinds of data that may be used to categorize content. As will be explained in the following in more detail, such keywords may be explicitly input by users, may be automatically generated or proposed based on an analysis of the input data, or may be proposed by the system and used if accepted by a prompted user or if in accordance with the individual preferences and/or interests of a user.

According to embodiments of the present disclosure, content may also be associated with time tags, which are either automatically generated while monitoring events or which are generated by user interaction. Such time tags enable the sorting of a plurality of events in chronological order, as a prerequisite for displaying selected ones of these events in chronological order.

The aforementioned input data may be stored in a database of the social network engine, usually together with the keywords and the associated time tags.

As shown in FIG. 2, the system further comprises a data filter engine, which filters the aforementioned input data, content or any data derived from these input data or content and transferred from the data input engine. This data filter will usually be located on the side of the provider of the social network as part of the social network engine, but may in principle also be located on the side of the user. As shown in FIG. 2, the data filter engine is fed with user preferences and/or interests, possibly also with user selections, in accordance with the individual list of keywords (interest cloud), as outlined below. According to the present disclosure, this individual list of keywords encodes specific preferences and/or interests of a user, and might also be fed with proposals for filters, e.g., in the case where a sponsored subscriber of the social network wishes to promote a new video game and thus causes the social network engine to propose all users of the social network or selected ones of these users to add certain preferences and/or interests to the personal profile of the user in order to increase his or her interest on video games in general or an a specific video game in particular.

Finally, as shown in FIG. 2, the data filter engine may also be fed with so-called social data, as the result of interactions of users of the social network or of subgroups thereof, such as communities. According to the present disclosure, such social data can modify the individual list of keywords (interest cloud) of a user. As an example, if the total number or percentage of users showing interest in a new video game (either explicitly, e.g., by mentioning the name of the new video game when being prompted for such input, or implicitly, e.g., as the result of user interactions, e.g., when the users click on a link or icon associated with the new video game) exceeds a certain threshold, the social network engine may propose all users of the social network or selected ones of these users to add certain preferences and/or interests to the personal profile of the user in order to increase his or her interest in the new video game. These proposals may either be accepted by the prompted users by means of a confirmative action, such as clicking on a "YES"-button, or may be accepted automatically, depending on the individual user profile or on the regulations of the provider of the social network.

As shown in FIG. 2, the content, e.g., the aforementioned input data, is filtered by the data filter engine in accordance with the user-specific interest cloud, i.e., a list of preferences and/or interests of the respective user. As an example, if the input data include data relating to video game events and political events, but the individual preferences and/or interests of a user indicate that the particular user is highly interested in video games but not at all in political events, all (or most of the) data relating to the political events is filtered out and only data relating to video games are passed through the data filter engine for display on the display of the user.

Figure 3:
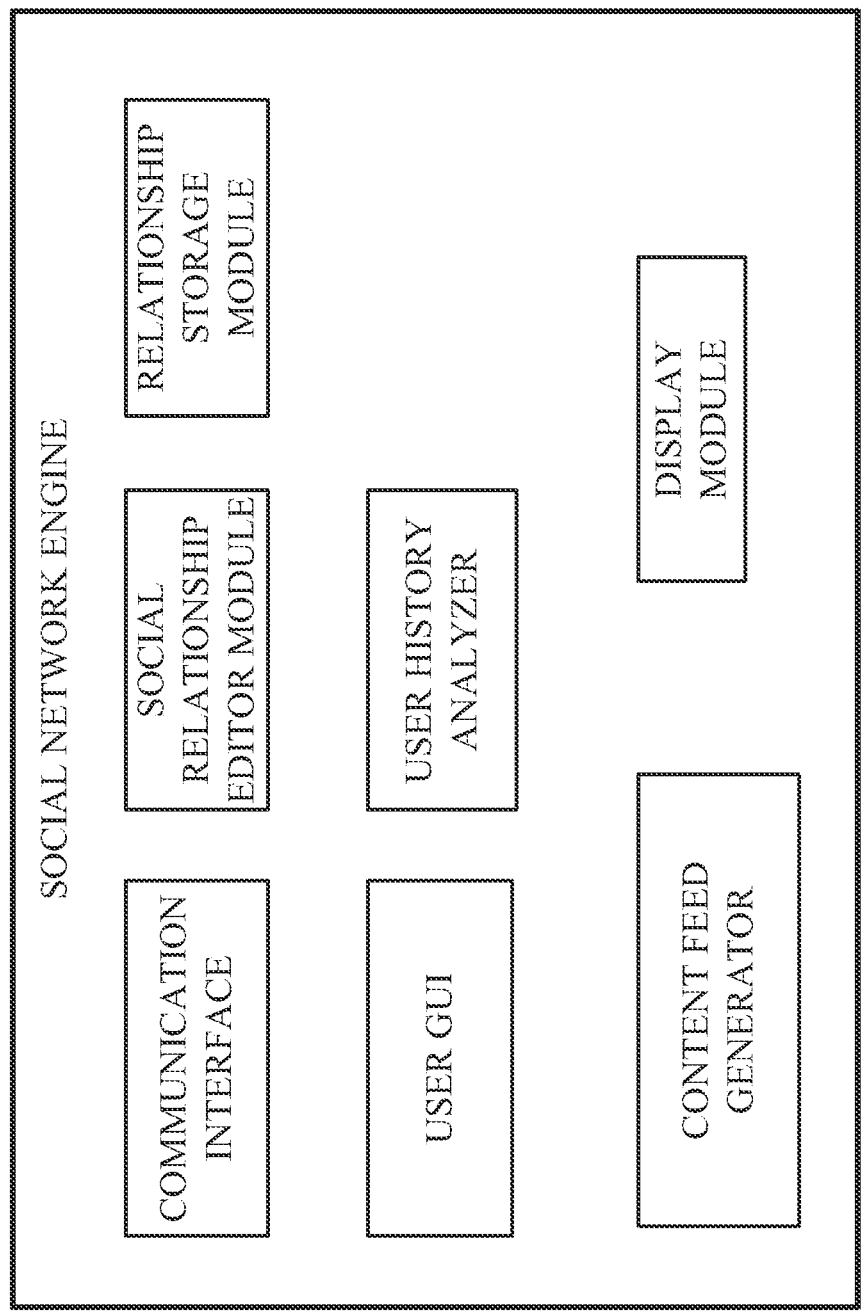
FIG. 3 is a schematic block diagram of the social network engine shown in FIG. 2.

For implementing the above functionality, a social network engine may include the components shown in FIG. 3, although the present disclosure shall not be delimited to only those components shown in FIG. 3. More specifically, the social network engine may include a communication interface, for handling communication and exchange of data of the user with the social network engine or with other users of the social network; a social relationship editor module, which serves, in particular, for assigning other users of the social network as friends and for monitoring and analyzing the whole data traffic in the social network for identifying candidate new friends for specific users, e.g., based on the past user interaction in the social network; a relationship storage module for storing data representing these assigned or candidate relationships; a module for driving a user GUI, a user history analyzer for monitoring and analyzing the interaction of a specific user or of all users of the social network or of subgroups thereof, such as communities; a content feed generator; and a display module configured for providing a display of the user's electronic device with relevant data, e.g., filtered content in the sense of the present application.

Figure 4:
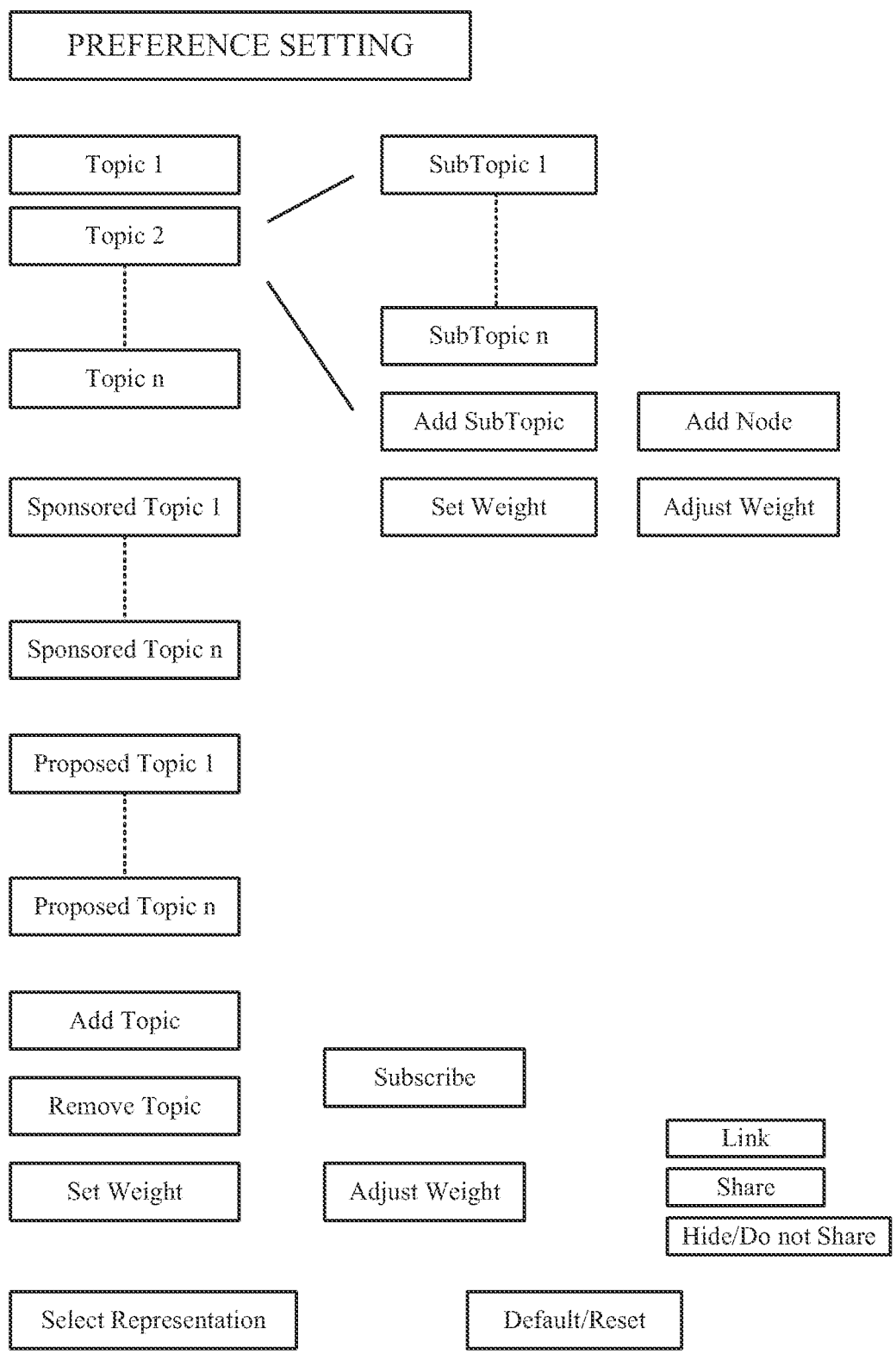
FIG. 4 is a schematic diagram summarizing options presented to a user to set or adjust a list of keywords, such as preferences and/or interests of a user, when interacting with the social network according to FIG. 1.

As set forth above, a user may specify individual preferences and/or interests when using and navigating the social network. The term "individual preferences and/or interests" in the sense of the present application shall comprise all suitable criteria and data for reliably identifying individual preferences, interests, dispositions, favorites, long-time user behavior, etc., of a specific user when exploring the social network. These individual preferences and/or interests may be input explicitly by the user by means of the web-oriented input mask as shown in FIG. 4, presenting a variety of options to a user to set or adjust his or her individual preferences and/or interests when interacting with the social network. It will be apparent that the input mask shown in FIG. 4 serves only as one example that shall not be construed to delimit the scope of the present application. According to the present application, these individual preferences and/or interests may, however, also be input implicitly or automatically, in the background, as outlined below in more detail.

More specifically, for selecting and adjusting his or her individual preferences and/or interests in the individual list of keywords (interest cloud), the social network engine may present an input mask as shown in FIG. 4, e.g., when clicking on a menu button ("PREFERENCE SETTING"). Under this menu item, the input mask presents a list of topics ("TOPIC 1," . . . , "TOPIC N"), which may be pre-selected topics pre-defined by the provider of the social network, which list may, however, also be the result of some kind of background computation, e.g., based on the list of preferred topics of friends with whom the specific user is already connected. As an example, these topics may include "FRIENDS ACTIVITIES," "GAMES," "RESULTS OF ONLINE-GAMING EVENTS," "COMMUNITY NEWS," and the like. As shown in FIG. 4, this list may further include so-called sponsored topics ("SPONSORED TOPIC 1" . . . , "SPONSORED TOPIC N"), which may be topics pre-defined by the provider of the social network, e.g., because of commercial interests of the provider such as advertisement and promoting of goods of customers or affiliated companies. As shown in FIG. 4, the list of topics may also include so-called proposed topics ("PROPOSED TOPIC 1" . . . , "PROPOSED TOPIC N"), which may be topics identified by the user history analyzer (see FIG. 3) as candidate topics of potential interest to a specific user based, e.g., on the recent user interactions of the user in the social network, or identified by the social relationship editor module as candidate topics of potential interest to a specific user based, e.g., on the friends with whom the specific user is connected to in the social network (relationship significance). Of course, the user history analyzer of the social network engine shown in FIG. 3 may also identify certain topics as candidate topics of potential interest to a specific user based on the overall user behavior of all users of the social network or subgroups thereof, such as communities. As an example, if the user history analyzer determines that a significant percentage of the users click on websites about specific topics, or if the user history analyzer determines that a significant percentage of those users that have defined a specific topic as a topic of preference and/or interest (subgroup) click on websites about this specific topic, then the social network engine may propose such topics as proposed topics in the input mask shown in FIG. 4. The individual user may then be prompted to confirm whether he or she wishes to add this proposed topic (or interest) to his or her list of individual preferences and/or interests (community significance).

As shown in FIG. 4, the user has options to add to and remove such topics (preferences and/or interests) from his or her individual list, at any time. The user may also subscribe to data feeds about certain preferred topics. E.g., the user may wish that a news feed with news about new video games is automatically scanned in accordance with his or her individual preferences and/or interests and that candidate new topics of interests are either proposed in the input mask shown in FIG. 4, in the manner as outlined above, or even automatically added to his or her individual list of preferences and/or interests.

As shown in FIG. 4, the user may also decide that certain or all preferences and/or interests included in his or her individual list are linked and/or shared with other users of the social network or even with users who are not members of the social network, or that such preferences and/or interests are hidden from and not shared with other users of the network (or as an alternative, hidden from and not shared with specific selectable other users or friends with whom the individual user is connected).

As shown in FIG. 4, when operating the input mask, the user may also assign or re-adjust so-called weights to selected ones of the above topics. In the sense of the present application, the term "weight" refers to any kind of variable or computational parameter suited to indicate the significance of a respective preference and/or interest to the individual user, which variable or parameter may be used to attribute a higher significance to such topics (preferences and/or interests) when filtering the input data. As an example, a user may decide that the topic "GAMES" and "NEWS ABOUT NEW GAMES" is of high significance, whereas the topic "COMMUNITY NEWS" is of almost zero importance to the user. In such a case, the user may assign, e.g., a high significance parameter in accordance with a uniform scale to the favorite topics "GAMES" and "NEWS ABOUT NEW GAMES" and a significance parameter of almost zero to the not-preferred topic "COMMUNITY NEWS." All this may be set or adjusted as specifically desired by the individual user at any time when exploring the social network.

If applicable, the user may add, remove, or change any of the above topics (preferences and/or interests) or assign or re-adjust desired weights to such topics.

As shown in FIG. 4, the user may also set or adjust the graphical representation for each of the above topics. As an example, the user may decide that all events relating to video games are shown as circles in the user's individual timeline accompanied by an icon showing a representative image of the video game, such as the trademark or most important character of the game, and that all events relating to the user's personal activities, such as appointments or conferences in the social network, are shown as squares in the user's individual timeline accompanied by an icon showing a representative image of the respective activity, e.g., a frog symbol relating to online chats and a mouse symbol for shared online game events.

As shown in FIG. 4, a list of second order subtopics may be attributed to each of the above topics (SUBTOPIC 1, . . . , SUBTOPIC N), each subtopic may be added or removed, and specific weights may be attributed to each of these subtopics, or re-adjusted. Furthermore, additional "nodes" may be added, which relate to the generic term for attributing one or more third-order subtopic(s) to a specific second-order subtopic.

It is noted that the "Hide/Do not share" button shown in FIG. 4 may be used for hiding a certain category of content, in accordance with the set individual preferences and/or interests of a user on the display of the user, but may also be hidden on the displays of other users of the social network, such as users which are connected with the user and with which the user generally shares the same or similar (matching) interests. In this manner, a complex interest cloud as an individual list of keywords representing all preferences and/or interests of an individual user may be built up as explained in more detail in the following.

Interest Cloud

More specifically, the interest cloud is a defined space of explicit and implicit preferences and/or interests shown, e.g., as weighted keywords that reflect the individual preferences and/or interests of a specific user or a specific group of users towards content (news, blogs, media, games, people, activities, sponsored content, ads, files, pages, etc.). The interest cloud itself is updated based on the behavior of the user—the system may implicitly weight keywords based on frequency of interaction of associated content—and/or the user directly and explicitly adding or removing keywords and increasing or reducing the weight of such keywords, based on the user's degree of interest, in the manner as set forth above with reference to FIG. 4. The user can re-weight, edit, modify, delete, or perform other changes also on implicit keywords from the system, to further refine the user's interest cloud. Context keywords are added or layered upon the existing interest cloud to maximize the correct representation of the user's true interests.

The interest cloud will mainly be used in online networks such as web communities and content portals but is not limited to these.

The purpose of the cloud is to give the user(s) an easy-to-understand, user-controlled and manageable representation of his/their interests towards content. As a secondary use, the self-managed interest cloud gives content producers (i.e., bloggers, advertisers, manufacturers, communities) a higher hit-ratio and content will be more accepted by the users if the content is actually in the interest of the recipient.

The interest cloud provides the server with information about keywords the user is or might be interested in depending on the user's direct interaction with the keywords, implicit keywords and contextual keywords. In other words, an interest cloud is a combination of user-defined keywords, auto-keywords and context based keywords that help the user to organize his interests.

Content the user has already marked as "interesting to me" will be part of his personal interest cloud by either becoming a keyword itself or by the system deriving keywords from that content. The system creates these implicit keywords by filtering the user's entered profile data, tracking his interaction with content and noting the data of other users he is connected to as well as users with similar interest cloud(s). This is not an exhaustive list: other methods can also be used to collect and predict implicit interest for the interest cloud.

In addition, the user (or users) may explicitly define keywords in the interest cloud by weighting their significance to him or her.

The user's context, if available, also adds keywords with weighting and significance to the interest cloud. This can include examples such as geographic position (for instance, being in a music shop in France, being in a movie theater, being in a restaurant).

Content of the Interest Cloud

The interest cloud contains keywords that stand for certain content, information or activities and any other possible items (preferences and/or interests). For instance, a keyword can be "politics, news" and link to news about politics in general, another can target a single subcategory of news, such as local politics or "news, politics, home country." Other keywords could be music tracks, video files, pictures, persons, characters, events and more.

Any keyword can theoretically link to any other keywords, creating links between products, persons, files, etc., and in any wanted granularity. Thus, any keyword is always in the context of its similar keywords. Context and similarity is partly defined by the system and partly defined by the active creation of new contexts by the user. It is up to the user to control their interest cloud (directly or indirectly, explicitly or implicitly). Each personal interest cloud also influences the overall context, i.e., if a lot of users connect to keywords manually together that had not been previously connected by the system, the general context or default connection will be updated, too.

Structure of the Interest Cloud

Every user can express multiple interest clouds, having a main interest cloud about the high-level content he is interested in, as well as interest-clouds for specific content-types, people, activities and more. Depending on the sub-pages and content-box, the community or network provides a sub-interest cloud that is focused on the specific interests for that sub-page, content-box or category.

Example: User A is not interested in news in general, thus, he doesn't include "news" in his main interest cloud. But when it comes to music, he is very interested in news about his favorite bands. His main interest cloud doesn't contain any news, but his music sub-group is concerned with everything about his favorite bands—including news.

Likewise, it is possible that the main-interest cloud defines a user's interest in "News" and has sub-interest clouds focused around topics such as music, cars, etc. In this case, the main-interest cloud is given hierarchy over the sub-interest clouds and hence "influences" the overall content that is provided to the user.

Each keyword in the interest cloud has its own weighting and significance attached to it. This reflects how important the item is to the user. The graphical representation of each keyword in the interest cloud reflects this weighting and significance in a unique manner that may also be adjusted individually in accordance with the needs and preference of the individual user. As an example, the significance of each keyword may be indicated by means of the font size, e.g., a bigger keyword shows a higher degree of importance, and a smaller keyword may show a lower degree of importance, but the present disclosure is, of course, not limited to this kind of display. Other means to display significance could be, e.g., by means of color-coding, numbers associated with the keywords and the like.

The interest cloud(s) of the user enables the server (social network engine) to process the interest cloud in order to provide each user with a higher relevancy of web content, media, files and people in an ordered, prioritized and organized way.

Implicit Keywords of the Interest Cloud

The interest cloud of any user may also be created dynamically, based upon the profile information the user added to his or her individual profile and by the user's online behavior. This automatic creation, and changes afterwards, reflects the interests of the user expressed in an implicit way.

The user can also provoke the system to propose implicit keywords based on existing keywords. For example, if the user adds "restaurants" as a keyword to his interest cloud, this triggers the system to suggest related keywords that might also interest him. These could include "fast-food restaurants," "exotic restaurants," "restaurants near my location," "restaurants my friends like," etc. Such proposals may be made based on some kind of expert system that, e.g., knows or learns from a user's behavior in the past that it is highly likely that a user might also be interested in certain subtopics (e.g., exotic restaurant) if he or she is interested in a certain main topic (e.g., restaurant).

Real-time Context Keywords

Real-time context-specific keywords may also be added dynamically, such as geographic context (being in a city, country, a shop, a restaurant) and other contexts (such as, but not limited to, being in winter, or in a particular week of the year). This lets the system retrieve content organized with the help of the user's interest cloud to ensure that is relevant to the context the user is in.

Explicit Interest Cloud

The user can also add, reprioritize, change, and delete any explicit and implicit keywords inside his interest cloud, on any level. He or she can also enable or disable, reprioritize, change and delete context-specific keywords, thus changing the interest cloud manually in any way needed to tailor it to his satisfaction and his context. This may be performed by operating the input mask described with reference to FIG. 4, but may also be performed directly in a graphical representation of the individual interest cloud as outlined below.

Hierarchy of the Interest Cloud

The complete interest cloud of a user may be organized in layers. There is, e.g., one main interest cloud and an open number of special interest clouds. The amount of clouds may depend on the actual amount of interests the user creates in his profile.

Main Interest Cloud

The main interest cloud of every user contains the most important interest keywords (preferences and/or interests) the user has, on a broad level. Interests of the main cloud apply to all special interest clouds. For example, if the user is interested in music in general, the news interest cloud will include news about music by default, as the system implies that this might be in the interest of the user, too.

Special Interest Cloud

The special interest cloud contains all interests a user has in a specific part of the cloud, e.g., all interests about games. By default, the special cloud is derived from the main interest cloud, but it can be altered as described above. As the interest cloud is a constantly changing network of interests linked to each other, the size and granularity of the cloud is highly dependent on the user's behavior.

Storage of the Interest Cloud

The interest cloud is stored as a network of keywords. The interest cloud is stored in several levels (e.g., main cloud, sub-clouds), is linked to a user or group, and is stored as part of their main profile on the server (social network engine), and is therefore available for the user anywhere when accessing his profile. A user's interest cloud will be stored alongside his profile for as long as that profile exists, and can be modified by the user at any time.

Display of the Interest Cloud

For displaying a graphical representation of the interest cloud in the way the cloud functions in the background, according to the present application, the items may be displayed in different groupings and styles (e.g., the size of a respective interest may indicate the significance attributed to the respective interest). Thus the user can quickly identify his major interests and how the other items are connected to each other.

Examples for the graphical representation of such an interest cloud and how these graphical representations are modified will be explained in the following, referring to FIGS. 5 to 10. It is noted that the following shall not be construed as delimiting the scope of the present disclosure.

Implicit, system-created interest keywords within the cloud have a distinguishable look compared to the explicit keywords. This differentiation includes but is not limited to color-coding, different font size, or the annotation of the keyword with symbols, e.g., @musicgroupname.

Context-created interest keywords within the interest cloud have a distinguishable look compared to the explicit and implicit keywords. This differentiation may include, but is not limited to, color-coding, different font-size, or the annotation of the keyword with symbols or additional characters, e.g., c_paris, c_restaurant.

Figure 5:
FIG. 5 is an exemplary graphical representation of a list of keywords according to the present disclosure, namely a so-called interest cloud showing the preferences and/or interests of the user as a result of setting or adjusting the personal preferences and/or interests.

In FIG. 5, keywords 502*a*, . . . , 502*e* in black letters indicate explicit keywords, i.e., keywords (preferences and/or interests) explicitly input by the user, e.g., by using the input mask of FIG. 4. Keywords 504*a*, . . . , 504*e*, enclosed by dashed ovals in FIG. 5, indicate implicit keywords. In the example, the location of the user while exploring the social network is detected by means of the user history analyzer (see FIG. 3) and communicated to the social network engine, which then proposes candidate keywords such as "foreign restaurants" 504*a*, "daily news in my area" 504*e*, or "my actively played games" 504*d*, which may then either be accepted (confirmed) by the user or rejected. This is one example of context-based data.

In FIG. 5, keywords 506a enclosed by a dotted oval indicate implicit keywords added based on location-based data. As an example, the geographical location of the user's mobile electronic device is continuously detected and communicated to the social network engine, which then, based on an expert system, proposes candidate keywords of potential interest to the user, such as "Japanese restaurant around my current location" 506a, if the system knows that the user has a certain interest in Japanese food, e.g., based on the selection and significance of the topic "Favorite Japanese restaurant" in the list of keywords (preferences and/or interests) of the individual user.

In FIG. 5, keywords 508a enclosed by a dashed and dotted oval indicate explicit keywords added by a different user of the social network, such as a friend connected to the user. As an example, if both users share the interest of enjoying movies, the second user (or as an alternative, the social network engine) may propose to the first user to add the item "new movies this week" 508a to his interest cloud. The first user can be made aware of this proposal, because this proposal may be clearly marked, for example, by means of color encoding explicit keywords added by a different user. The exclamation mark "!" in the interest cloud (or any other suitable graphical symbol) indicates that the new explicit keyword needs to be confirmed before it will be added as a real effective keyword to the individual interest cloud of the first user. Of course, if the first user should reject (not confirm) the proposed keyword, it will finally disappear (or become inactive) in his individual interest cloud. As an alternative, the proposed keyword may become active (effective) if the user should not operate the proposed keyword during a given time period.

In FIG. 5, the question mark "?" (or any other suitable graphical symbol) indicates that the new implicit keyword needs to be confirmed before it will be added as a real effective keyword to the individual interest cloud of the first user. Of course, if the first user should reject (not confirm) the proposed keyword, it will disappear (or become inactive) in his individual interest cloud. As an alternative, the proposed keyword may become active (effective) if the user should not operate the proposed keyword during a given time period.

As will become apparent to a person skilled in the art, instead of changing or re-adjusting the individual preferences or interests in an input mask, such as that shown in FIG. 4 and explained above, the user may, of course, also grasp certain keywords in the interest cloud shown in FIGS. 5 to 10 and move or manipulate these keywords as desired to thereby establish new user-specific preferences and/or interests. As an example, by dragging the keyword "News about my friends" from the left-hand side of the interest cloud towards the right-hand upper part of the interest cloud, i.e., near the keyword "Japan," new links between keywords may be established, linking, e.g., news about all those friends of the user that are interested in the topic Japan, to thereby establish a link between these friends and the topic "Japan." This is an example of a graphics-oriented modification of the interest cloud.

The interest cloud described above is one example of how an interest cloud works. The example may use different colors and dashed lines to show the status of the different keywords. For example, all black keywords may be edited by the user, and all keywords enclosed by a dashed line or represented with a green color may be implicit and added by the system as suggestions to the user, based on his interests. A dotted line or blue color may also represent an implicit keyword, but may be added based on the current location of the user. Keywords represented in red color or enclosed by dashed and dotted lines may be a suggestion by a friend of the user.

Question marks in the above example show where new additions are made by the system that the user might want to edit. They are an optional feature to highlight changes in the interest cloud. Exclamation marks are similar, as they also wait for confirmation, but were added explicitly by a friend of the user and, thus, have a different quality to the interest cloud.

Figure 9:
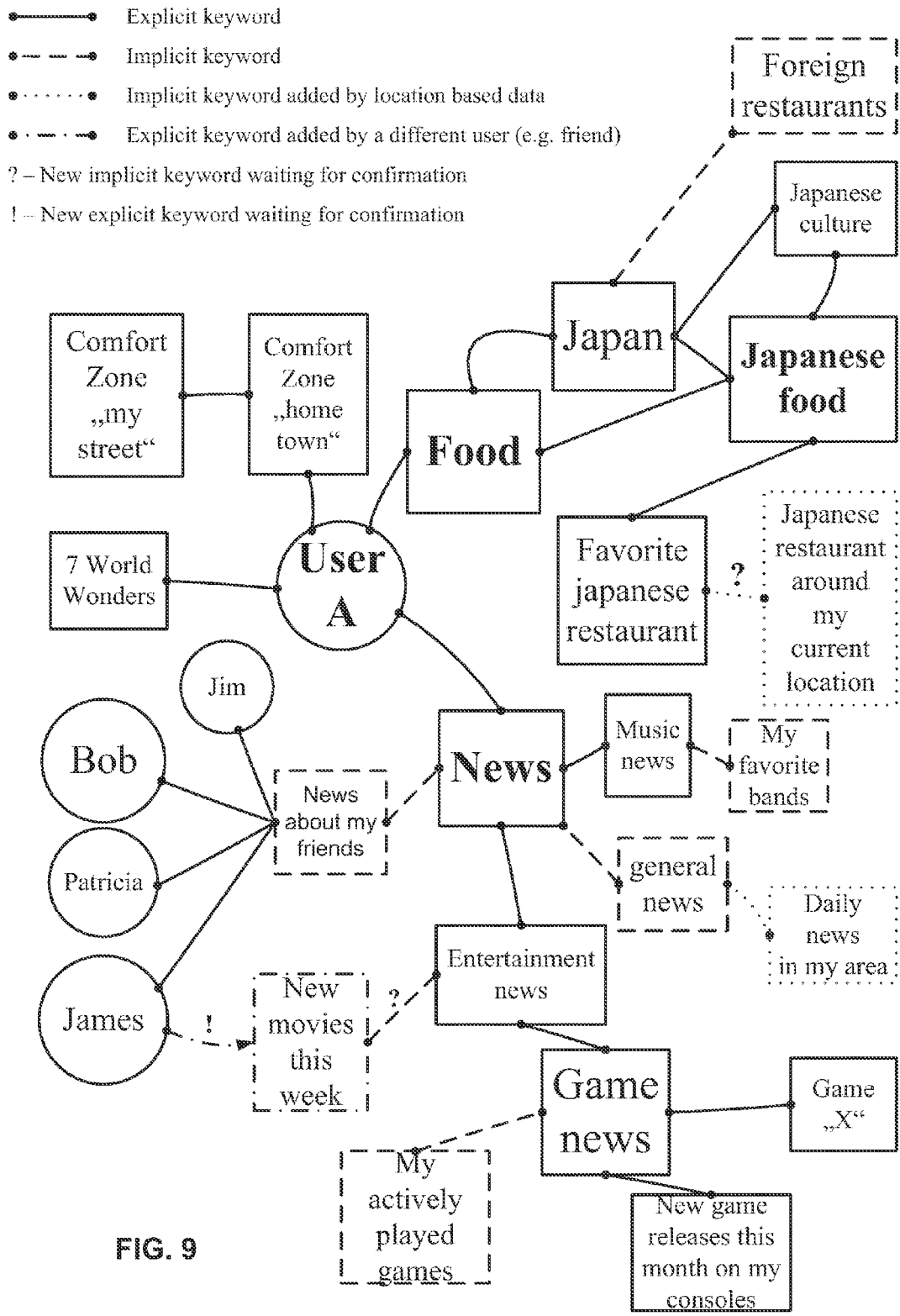
FIG. 9 is an exemplary graphical representation of another embodiment of a list of keywords (interest cloud) according to the present disclosure.

Of course, different graphical representations of the interest cloud may be utilized, implying different graphical encodings for relationships and functionality. One example for such an alternative graphical representation is shown in FIG. 9, where the different sizes of graphical symbols or circles indicate the weights attributed to specific keywords displayed in the interest cloud.

As will become apparent to a person skilled in the art, many different styles of graphical representations may be utilized for displaying the individual keywords (preferences and/or interests) of an individual user.

Figure 6:
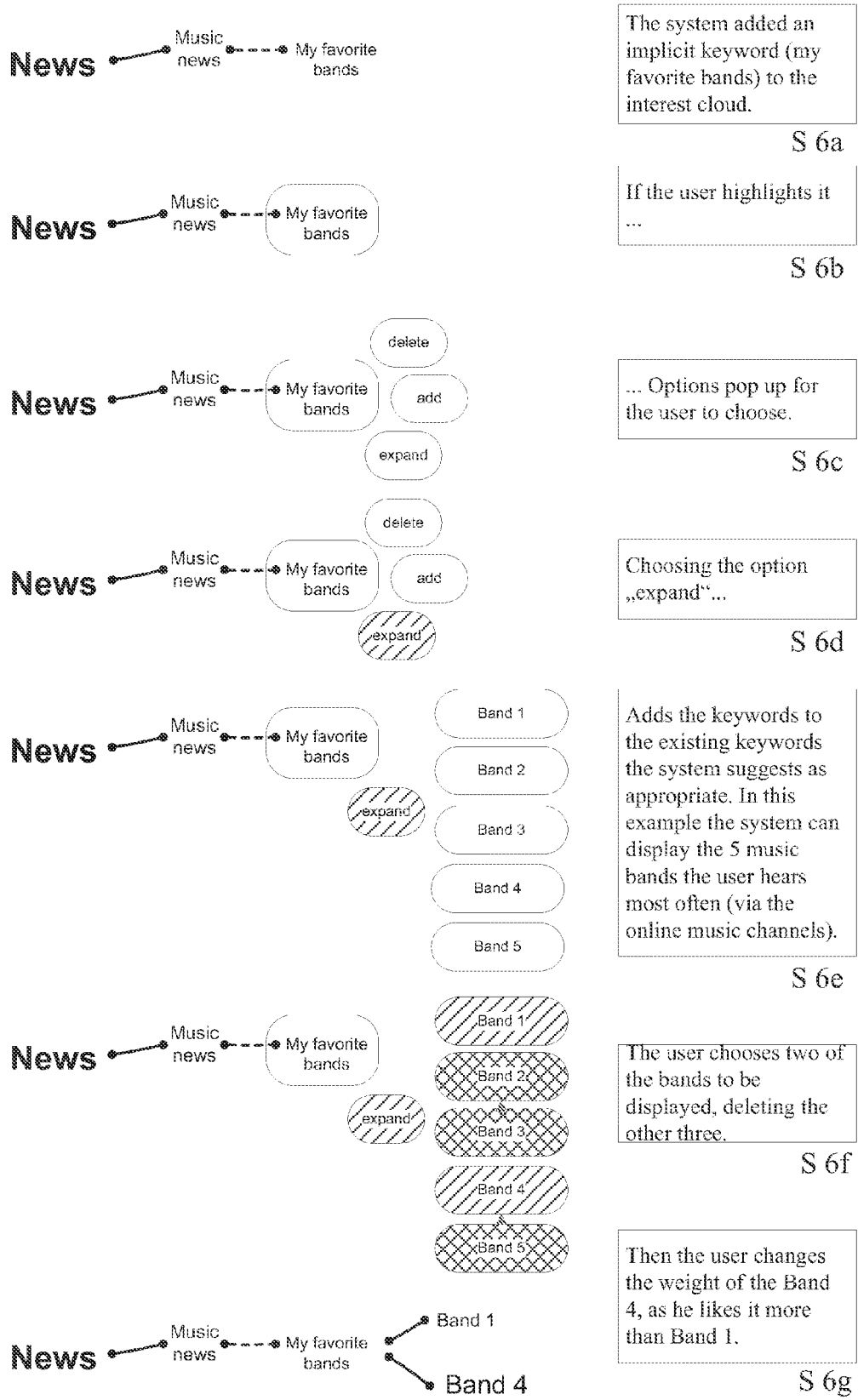
FIG. 6 schematically summarizes the steps of modifying a list of keywords (interest cloud) according to another embodiment of the present disclosure.

With reference to FIG. 6, a method for modifying an interest cloud, such as that shown in FIG. 5, will be described in more detail. In FIG. 6, the rectangular boxes show comments explaining in brief what is shown in the respective left-hand part of the respective drawing.

As shown in the upper part (step S 6a), based on the user's interaction, the system has added an implicit keyword ("my favorite bands"), which may be indicated in green letters to symbolize a suggestion added by the system to suggest a new keyword to the user and linked with the respective top-level keyword "music news" by a dashed line ending in small dots.

As shown in step S 6b, if a user highlights this suggestion, e.g., by activating a special-purpose button or by simply navigating onto the suggested implicit keyword, several options pop up for a further selection by the user, such as "delete" (implicit keyword), "add" (implicit keyword) and "expand" (implicit keyword), as shown in step S 6c. The options "add" and "delete" cause the suggested implicit keyword to be added or deleted from the interest cloud.

If the user selects the option "expand" as shown in step S 6d, the expand symbol is highlighted, in this example, by hatching of the option symbol, and further options pop up as a suggestion to and for selection by the user, namely specific band names "band 1" to "band 5," as shown in step S 6e.

In response, the user may select some of these suggestions, e.g., in this example "band 1" and "band 4." These graphical symbols are also highlighted, in this example, by hatching of the option symbol, as shown in step S 6e, and the sub-keywords selected, namely "band 1" and "band 4," are added to the interest cloud of the user.

Finally, the interest cloud is modified and displayed, as shown in step S 6g, with the suggested and selected new sub-keywords "band 1" and "band 4" indicated in the same manner as those keywords already included in the list of keywords, namely, in black solid letters and with black-colored interconnection lines. In this way, a modified list of keywords (modified interest cloud) is generated, which is then used in the future for selectively filtering content and displaying the filtered content in accordance with the modified interest cloud on the display of the user.

Changing keywords (implicit and explicit) is the same for the user. Depending on the keyword, several options can present themselves (such as delete, add, move, expand, etc.). The system can suggest new keywords to add, show other ways to connect existing keywords to the cloud to improve the overview, or lead the user to new activities based on the keyword. For example, as shown in table above, the newly added bands can provoke new implicit keywords that can link to the online shop so the user can buy the music of these specific bands.

Figure 7:
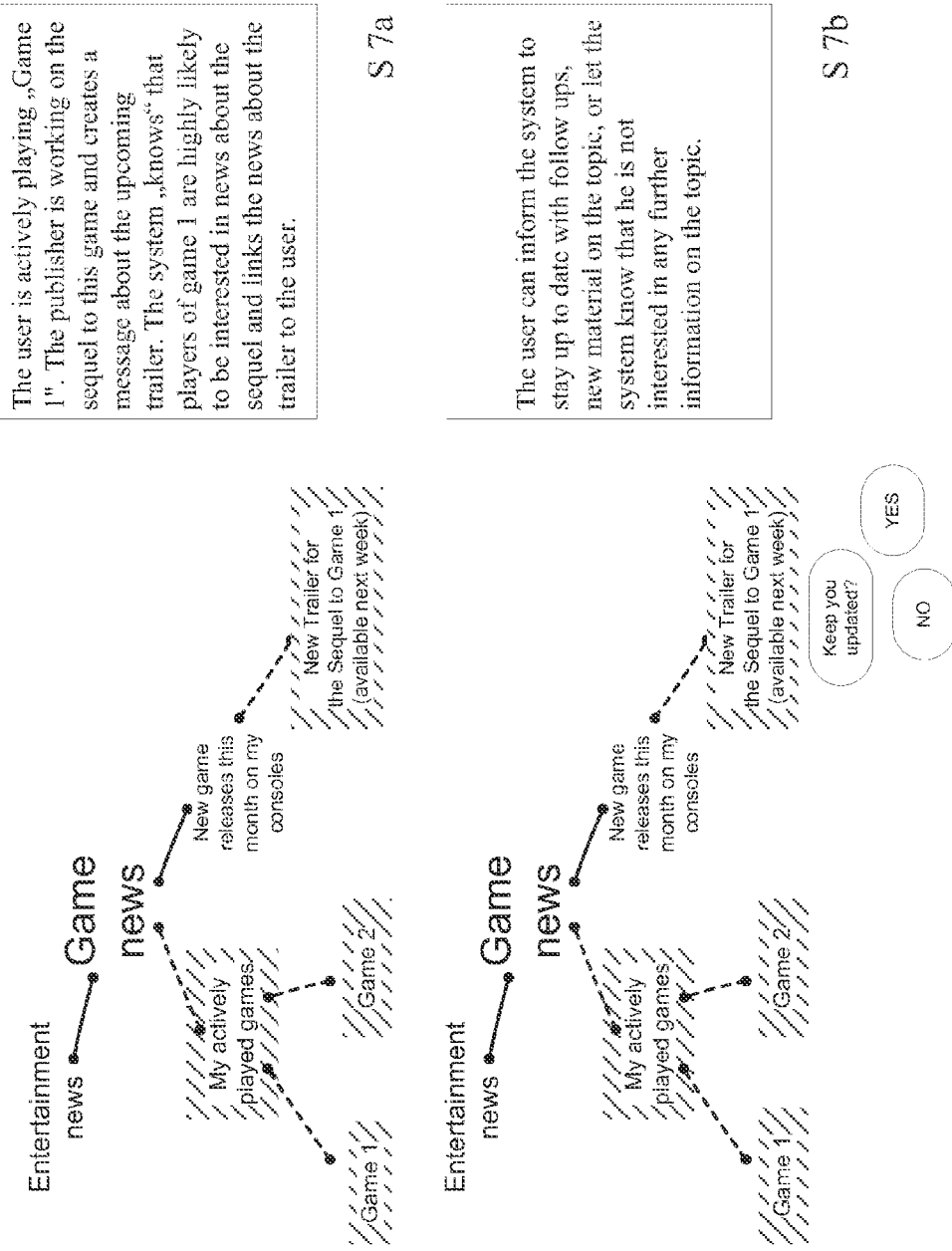
FIG. 7 schematically summarizes the steps of modifying a list of keywords (interest cloud) according to another embodiment of the present disclosure.

FIG. 7 shows another example of creating and modifying an interest cloud. In this example, the system makes several suggestions for implicit keywords which may be highlighted, for example, by hatching or a color. In the following, we will focus on the system's suggestion that a new trailer for a new sequel of a certain game, in which the user is already interested (named "Game 1" in this example), will be released in the next week. This suggestion for an implicit keyword may be generated by the system, e.g., based on the user's interaction with the system, more specifically based on the fact that the user is actively playing the game "Game 1." Based on keywords that are accompanying raw input data input to the system, the system knows that the publisher of "Game 1" is working on the sequel to this game. Based on the user's interaction, the system knows that the user (actively playing "Game 1") is highly likely to be interested in news about "Game 1" and, therefore, the system makes the suggestion for adding the implicit keyword to the user's interest cloud by adding the sub-keyword "New Trailer for the Sequel to Game 1 (available next week)."

If the user navigates onto the suggested implicit keyword, further options may pop up, as shown in step S 7b, such as "Keep you updated? Yes" and "Keep you updated? No" as shown.

FIG. 8 summarizes the method steps for proposing and entering implicit keywords into the interest cloud of a first user based on the interactions of other users of the social network that the user is connected with (e.g., "friends").

More specifically, the user James, to which the first user is connected (e.g., via similar interests in the individual profiles of both users matching with each other or via a "friends" function or button of the social network), suggests "new movies this week" as an implicit keyword to the first user. This suggestion for an implicit keyword is cross-hatched in step S 8a. If the first user navigates on this new implicit keyword, an option pops up in the interest cloud as shown in step S 8b, namely "add (interest) to cloud? Yes/No." If the user selects the option "YES" shown in step S 8b, the hatching or color of the new keyword may change (to indicate an implicit keyword suggested by the system and added to the interest cloud) and the link between "New movies this week" and friend "James" is deactivated (separated) and the link between "New movies this week" and the keyword "Entertainment News," which is already included in the interest cloud of the user, is set, as shown in step S 8c. As shown in step S 8d, once the user has accepted the new keyword, the system may now propose another implicit keyword, such as "movie theater(s) near my location," based on the location of the user. In this way an interest cloud in accordance with the specific needs or profile of the user of the social network, or other data, may be built up and updated.

As will become apparent from the above, it will usually be preferable that a user can only control his own interest cloud and can not directly control the clouds of other users, although a user may influence the cloud of others by, e.g., making suggestions. Suggestions by other users, be they trusted friends or advertising companies, are marked as such and can be accepted or rejected. Both choices are stored and will influence future suggestions to the cloud. In some embodiments, suggestions are not targeted towards specific users. A suggestion is like any other added interest keyword with information as to who might be interested in it.

In the example of FIG. 8, the user's friend, James, added a keyword "new movies this week" to his cloud with the context that this is something he wants to share with his friends. As the first user is also interested in entertainment news, he adds this new keyword to his interest cloud.

FIG. 9 shows another embodiment of the interest cloud of a user, wherein the implicit and explicit keywords, as well as suggestions of the system and related options, are encoded in a different manner.

As will become apparent from the above, users such as vendors or manufacturers (or game publishers, as in the example above) can add keywords to, for instance, media content (e.g., a trailer for a new product) in order to inform fans about the coming product. The added content is automatically connected to users who might be interested in the product. These users may be identified by scanning through the profiles of all users of the social network and identifying those users having keywords in their interest cloud which match with the implicit keyword proposed by the system in accordance with the product. When displayed to the user, his keyword can be accepted or rejected by the user, which in the process tells the system that he wants to get more on the topic in the future, or not.

The goal of future content is to link the content to the user ahead of time. This serves as a reminder and also delivers personally relevant information to the user.

Obtaining and Filtering Input Data

Figure 10:
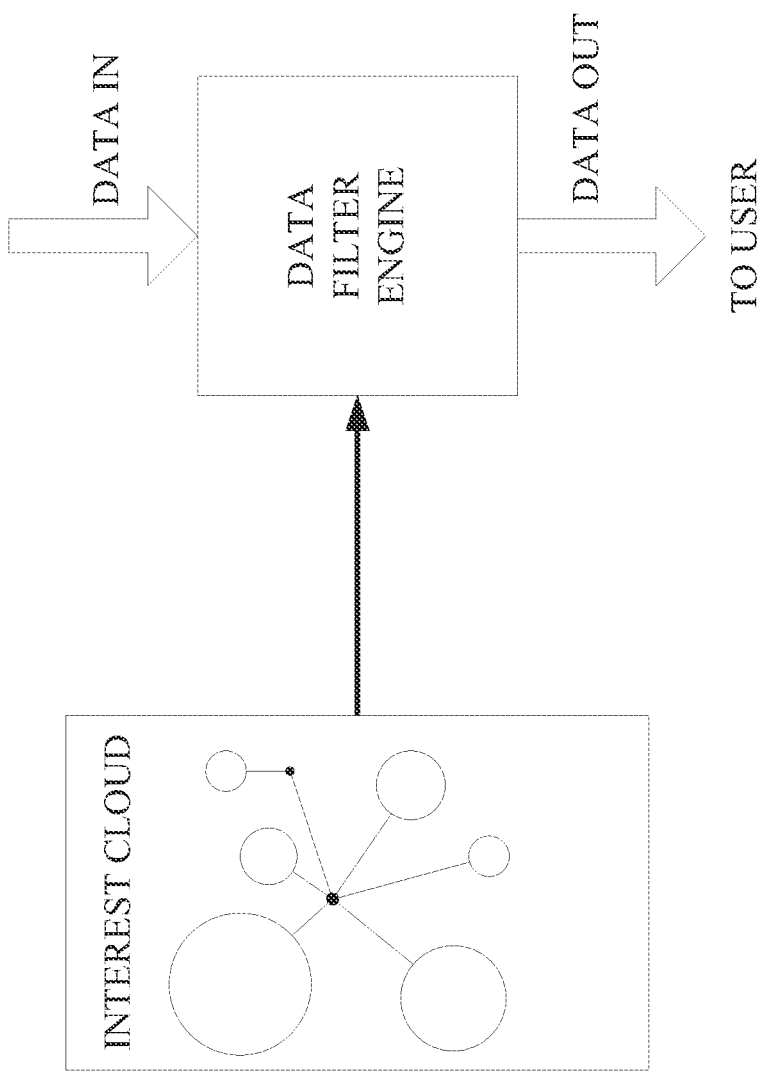
FIG. 10 schematically summarizes the steps of a method according to the present disclosure to selectively filter input data (content) to thereby create modified data that are output to a graphical user interface to be displayed (modified content)

Referring to FIG. 10, the data filter engine receives input data (DATA IN) in various different ways and from various different sources as outlined above, in particular as explained with reference to FIG. 2 above.

The received or input data may include a time-tag indicating the exact date of some kind of event in the future, present, or past. Preferably, once a datum (e.g, an event) is associated with a time-tag, the time-tag is either in a pre-defined data format or the existence of the time-tag is indicated by a flag or similar indication in the datum enabling a quick and simple search for such time-tags and further processing. As an example, a user may enter data (information) about an event together with time information about the exact date and possibly also time duration of the event and, according to the present disclosure, the data about the event and the time-information (time-tag) are linked with each other.

The input data are then further processed. As an example, the input data may be stored in a database accessible by all or selected users of a social network via the social network. Or, the input data may be associated with various kinds of keywords and stored in a database of the social network, thus enabling a quick and simple categorization of the data in accordance with, e.g., individual user preferences and/or interests. Or, the data may be sorted in chronological order, in accordance with the time history given by the time-tags associated with the data. The data may then be stored in the database in this chronological order. Or, the social network engine generates a link to the event and some keyword information about the event that will be sent to the individual user later instead of transmitting all detailed information about the event. By clicking on the link or icon, the user may then retrieve information about the event only if needed to save computing time and transmission bandwidth otherwise. As will become apparent to the person skilled in the art, the input data can be further processed in many different ways.

Once a user is logged in to a social network, a request for data is generated by the user, requesting content (data) from the social network engine, such as his personal news data, information about news in the social network, new messages and notifications in the social network for the user, or other content. The data filter engine then selects (sorts out) all those data in accordance with user-specific preferences and/or interests (as entered into the individual list of keywords (interest cloud) of the user) and presents these data to the user (DATA OUT). In this regard, the data filter engine shown in FIG. 2 may filter the input data (or as an alternative, data stored for the user in a data storage) in accordance with the individual preferences and/or interests (interest cloud) of the user, possibly also in accordance with additional data such as user selection data, proposals for filters, or social data (see FIG. 2), and enables access to these data by the specific user. This does not exclude, of course, that also other data may be provided to the user. However, those input data that are selected in accordance with the individual preferences and/or interests of the specific user are treated or transmitted with higher priority for the specific user. The filtered data (content) are then displayed on the display of the user's electronic device, of which one example embodied as a smart phone is shown in FIG. 11.

Figure 11:
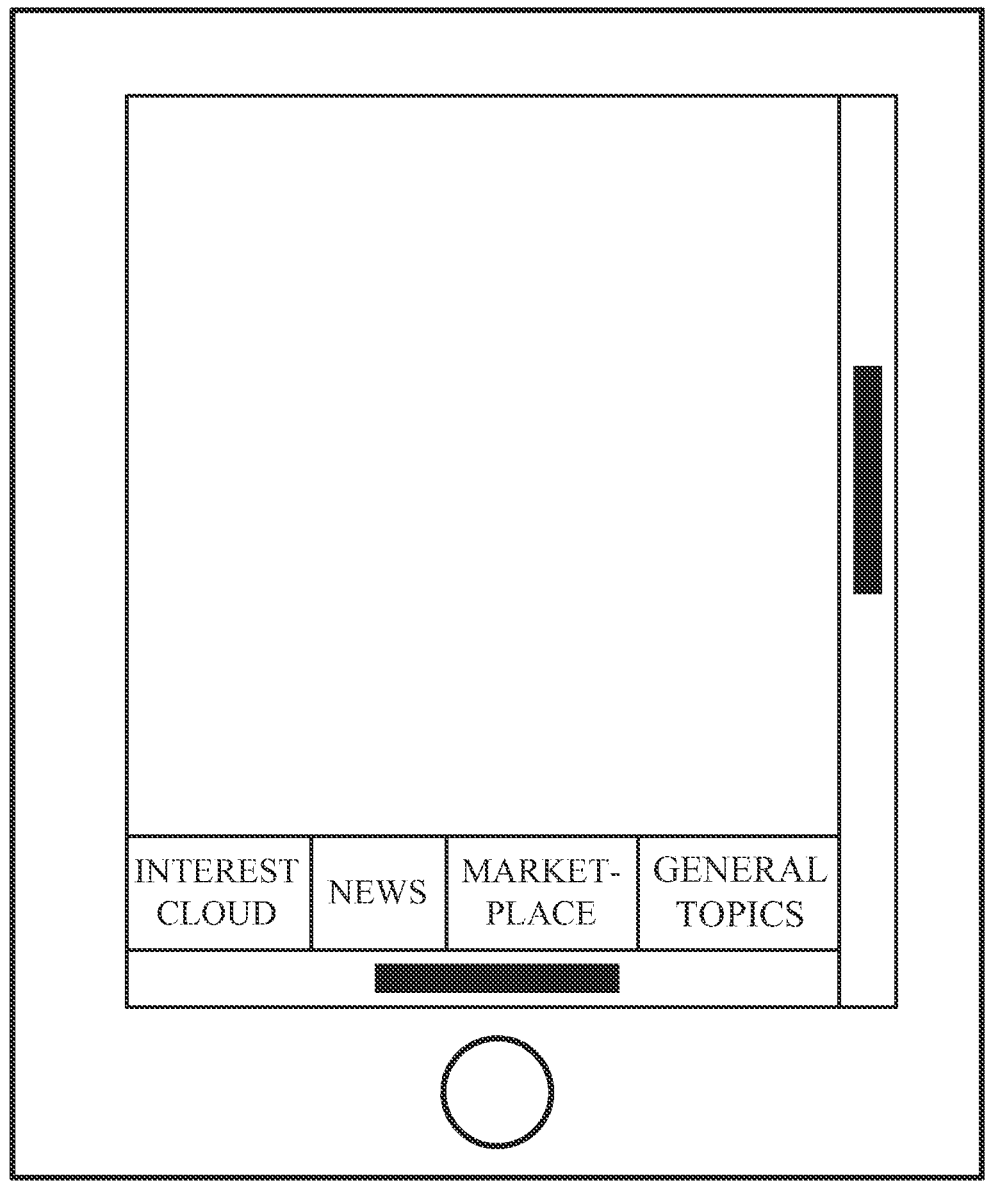
FIG. 11 schematically shows a mobile electronic device embodied as a smart phone displaying a graphical user interface for performing the method according to the present disclosure.

As shown in FIG. 11, the user's mobile electronic device comprises a display for displaying content. As shown in FIG. 11 the smart phone has a touch-sensitive display with sliders on the right-hand side and bottom rim for sliding/scrolling the display area as desired. The display displays content as indicated by the schematic lines in the central area of the display. Furthermore, the display displays several buttons ("INTEREST CLOUD," "NEWS," "MARKETPLACE," "GENERAL TOPICS"), which, if activated, cause a new window to be opened on the display. If the button "INTEREST CLOUD" is activated (e.g., when touched), the user's interest cloud is opened and displayed as outlined above. If the button "NEWS" is activated, a new window is opened, which displays news, which is filtered in accordance with the interest cloud of the user. As an example, if the interest cloud includes the preferences and interests of the interest cloud shown in FIG. 5, in the "news" windows news relating to the preferred topics "entertainment news," general news," "music news," and "news about my friends" will be displayed with preference, taking into consideration also the sub-keywords, such as "daily news in my area," and the like.

As will become apparent, the user may switch between the "interest cloud" window and any other window repeatedly. Any modification of the interest cloud will have a corresponding influence on any function for displaying content, such as displaying news.

As an example of how the filtering of content based on the user's specific interest cloud may have an influence on the content actually displayed on the user's display, reference is made to FIGS. 12a and 12b in the following. FIG. 12a schematically shows the display of a user after creating a first interest cloud of his specific preferences and/or interests. Based on this interest cloud, certain settings for filtering content are used to combine the content to build-up the display of FIG. 12a, which includes six fields for advertising, as schematically indicated by the crossed-out boxes labled "1" to "6." For instance, the user may add the keyword "Paris" to his interest cloud, indicating, e.g., that he is interested in topics about the city of Paris. Then, in accordance with the other keywords of the user the filtered content is generated, including the advertisements "1" to "6."

Figure 12B:
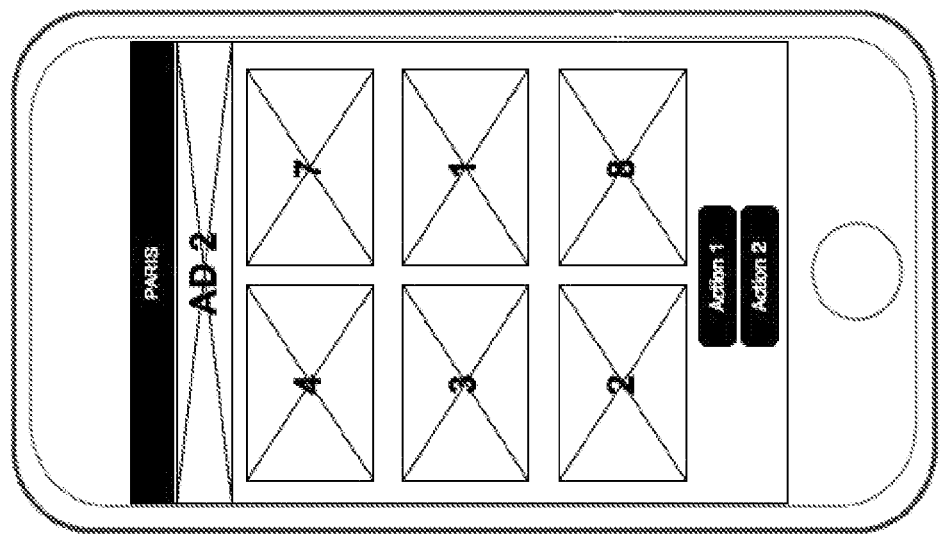
FIGS. 12*a* and 12*b* schematically show a display of a smart phone with content displayed in accordance with a first list of keywords (interest cloud) or a second different list of keywords (interest cloud).
Figure 12A:
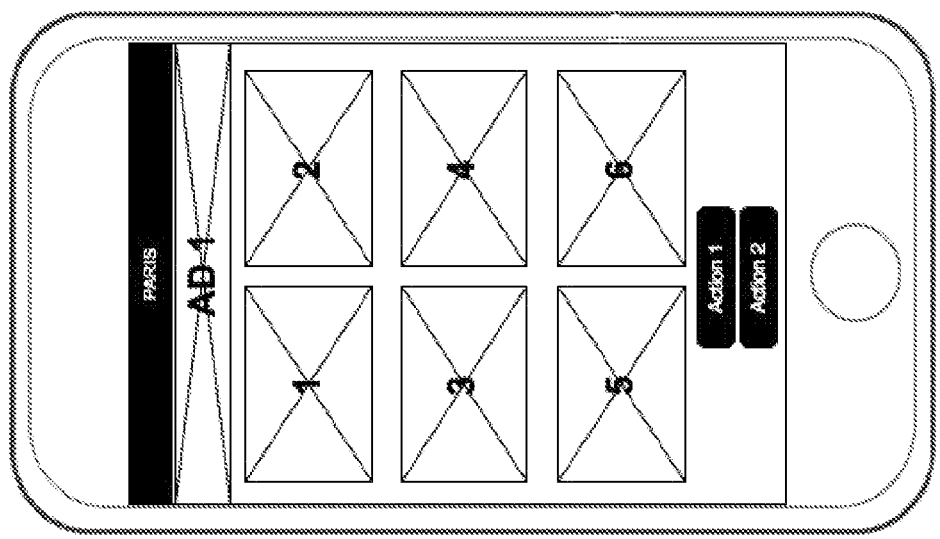

If the same user modifies his interest cloud, this may result in a different filtering of content and selection of advertisements, as indicated by the crossed-out boxes "4," "7," "3," "1," "2," and "8" in FIG. 12b. It is noted that some of the advertisements selected by the system for the particular user may be the same, but that the order in which these advertisements are displayed to the user is modified in accordance with the updated interest cloud of the user. Of course, FIG. 12b may also show the display of another user having a different interest cloud (different preferences and/or interests). Of course, the crossed-out boxes in FIGS. 12a and 12b may be representative for any content (data) to be displayed on the user's display.

As will become apparent to the person skilled in the art, the method according to the present disclosure provides added visibility of relation to activities, events, content and people—which collectively can be referred to as moments—and the visualization of the dynamic significance changes the timeline into an easy-to-use productive social life tool when using social networks.

While various embodiments have been described above, it should be understood that they have been presented by way of example only, and not limitation. For example, any of the elements associated with the social network engine may employ any of the desired functionality set forth hereinabove. Thus, the breadth and scope of the claimed subject matter should not be limited by any of the above-described exemplary embodiments.

The embodiments of the invention in which an exclusive property or privilege is claimed are defined as follows:

1. A computer-implemented method for selectively displaying content to a user of a social network, comprising:
   maintaining in a computer system for each user of a social network a profile including data on individual preferences and/or interests of the user and significance of each preference and/or interest for the user, at least some of the individual preferences and/or interests being encoded as an interest cloud, the interest cloud including a list of keywords, wherein the list of keywords includes explicit keywords defined by the user and implicit keywords created by the system, each keyword having an attached weighting representing the significance, wherein the interest cloud is stored as a network of keywords of said list of keywords being stored as part of said profile of said user on a central server of said social network, wherein each keyword is linked by a connection to one or more other keywords of the list of keywords to create a context or similarity for the network of keywords;
   setting said list of keywords comprising:
      displaying a graphical representation of said list of keywords on a graphical user interface (GUI) of an electronic device operated by said user, said graphical representation comprising an indication of the significance of said keywords and the connection of said keywords with other keywords included in said list of keywords and a graphical scheme that distinguishes explicit keywords defined by the user, explicit keywords defined by a member of the social network, and implicit keywords suggested by the system based on the user's interest and/or the user's location;
      modifying, by the computer system, the significance and connection of said keywords in response to navigational input data of said user to thereby obtain a modified list of keywords including the keywords and the respective significance and connection associated therewith; and storing said modified list of keywords as part of the profile of said user on a central server of said social network;
providing input data including content;
receiving a request of said user for displaying content;
filtering the input data including the content in accordance with the individual preferences and/or interests; and
selectively displaying the filtered content to said user in response to said request, wherein said filtered content is displayed in accordance with the profile of said user, in accordance with the list of keywords and in accordance with the individual preferences and/or interests of said user.

2. The computer-implemented method as claimed in claim 1, wherein said graphical representation of said list of keywords is displayed as a separate window of said GUI upon activation of a menu button of said GUI.

3. The computer-implemented method as claimed in claim 2, wherein said GUI is configured to display said filtered content in a central display area of said GUI, said menu button being persistently displayed at a periphery of said central display area of said GUI.

4. The computer-implemented method as claimed in claim 3, wherein the filtered content displayed in the central display area of said GUI is modified upon modification of said list of keywords and wherein the user can repeatedly change between a window for displaying the graphical representation of the modified list of keywords and a window for displaying the modified filtered content.

5. The computer-implemented method as claimed in claim 1, wherein said step of setting said list of keywords further comprises:
displaying a plurality of explicit keywords included in said list of keywords together with a representation of the significance of said explicit keywords and how the explicit keywords are connected with each other.

6. The computer-implemented method as claimed in claim 1, wherein said step of setting said list of keywords further comprises a step of generating an implicit keyword, comprising:
displaying at least one implicit keyword as a candidate keyword in said graphical representation of said list of keywords, said candidate keyword being displayed in a different manner or style than the keywords already included in said list of keywords;
prompting or waiting for an interaction of said user with the candidate keyword confirming that the candidate keyword shall be entered in said modified list of keywords; and
displaying the candidate keyword with the same graphical scheme used to display the other keywords already included in said list of keywords to thereby enter a new keyword in said modified list of keywords.

7. The computer-implemented method as claimed in claim 6, wherein said step of generating an implicit keyword further comprises:
monitoring and analyzing the user's interaction with content displayed on said GUI;
associating at least one new keyword with said content displayed on said GUI and a significance thereof; and
displaying said at least one new keyword as a candidate implicit keyword in said graphical representation of said list of keywords if said significance exceeds a predetermined threshold.

8. The computer-implemented method as claimed in claim 7, wherein said step of generating an implicit keyword further comprises:
determining a candidate connection of said at least one new keyword based on the user's interaction with content displayed on said GUI determined in said step of monitoring and analyzing the user's interaction with content displayed on said GUI; and
displaying said at least one new keyword as a candidate implicit keyword in said graphical representation of said list of keywords together with a proposal for a connection with keywords already included in said list of keywords.

9. The computer-implemented method as claimed in claim 6, wherein said step of generating an implicit keyword further comprises:
monitoring and analyzing the user interactions of a plurality of members of the social network with content displayed on the graphical user interfaces of said plurality of members;
associating at least one new keyword based on said user interactions of said plurality of members of the social network and determining a significance of said at least one new keyword; and
displaying said at least one new keyword as a candidate implicit keyword in said graphical representation of said list of keywords if said significance exceeds a predetermined threshold.

10. The computer-implemented method as claimed in claim 9, wherein said step of generating an implicit keyword further comprises:
determining a candidate connection of said at least one new keyword with keywords already included in said list of keywords based on the user interactions; and
displaying said at least one new keyword as a candidate implicit keyword in said graphical representation of said list of keywords together with said candidate connection.

11. The computer-implemented method as claimed in claim 9, wherein said plurality of members of the social network have identical or similar preferences and/or interests.

12. The computer-implemented method as claimed in claim 6, wherein said step of generating an implicit keyword further comprises:
monitoring and analyzing the user interactions of at least one member of the social network who is connected to said user with content displayed on a GUI of said at least one member, said at least one member being connected with said user via the settings of the user's profile or a friend's profile;
associating at least one new keyword based on said user interactions of said at least one member of the social network and determining a significance of said at least one new keyword; and
displaying said at least one new keyword as a candidate implicit keyword in said graphical representation of said list of keywords if said significance exceeds a predetermined threshold.

13. The computer-implemented method as claimed in claim 12, wherein said step of generating an implicit keyword further comprises:
determining a candidate connection of said at least one new keyword with keywords already included in said list of keywords based on the user interactions; and
displaying said at least one new keyword as a candidate implicit keyword in said graphical representation of said list of keywords together with said candidate connection.

14. A computer system for running a social network comprising a plurality of members and selectively displaying content to a user of the social network, said computer system including at least one computing device having a processor, said system configured to:
  maintain in the computer system for each user of the social network a profile including data on individual preferences and/or interests of the user and significance of each preference and/or interest for the user, at least some of the individual preferences and/or interests being encoded as an interest cloud, the interest cloud including a list of keywords, wherein the list of keywords includes explicit keywords defined by the user and implicit keywords created by the system, each keyword having an attached weighting representing the significance, wherein the interest cloud is stored as a network of keywords of said list of keywords being stored as part of the profile of said user on a central server of said social network, wherein each keyword is linked by a connection to one or more other keywords of the list of keywords to create a context or similarity for the network of keywords;
  set the list of keywords by:
    displaying a graphical representation of said list of keywords on a graphical user interface (GUI) of an electronic device operated by the user, the graphical representation comprising an indication of the significance of the keywords and the connection of the keywords with other keywords included in said list of keywords and a graphical scheme that distinguishes explicit keywords defined by the user, explicit keywords defined by a member of the social network, and implicit keywords suggested by the system based on the user's interest and/or the user's location;
    modifying the significance and connection of the keywords in response to navigational input data of the user to thereby obtain a modified list of keywords including the keywords and the respective significance and connection associated therewith; and
  storing the modified list of keywords as part of the profile of the user on a central server of the social network;
  provide input data including content;
  receive a request of the user for displaying content;
  filter the input data including the content in accordance with the individual preferences and/or interests; and
  selectively cause the filtered content to be displayed to the user in response to said request, wherein the filtered content is displayed in accordance with the profile of the user, in accordance with a list of keywords and in accordance with the individual preferences and/or interests of the user.

15. The computer system as claimed in claim 14, wherein the graphical representation of the list of keywords is displayed as a separate window of the GUI upon activation of a menu button of the GUI.

16. The computer system as claimed in claim 15, wherein the GUI is configured to display the filtered content in a central display area of the GUI, the menu button being persistently displayed at a periphery of the central display area of the graphical user interface.

17. The computer system as claimed in claim 16, wherein the filtered content displayed in the central display area of the graphical user interface is modified upon modification of the list of keywords and wherein the user can repeatedly change between a window for displaying the graphical representation of the modified list of keywords and a window for displaying the modified filtered content.

18. The computer system as claimed in claim 14, wherein the list of keywords is further set by:
  displaying a plurality of explicit keywords included in the list of keywords together with a representation of the significance of the explicit keywords and how the explicit keywords are connected with each other.

19. A non-transitory computer-readable storage medium having tangibly embodied thereon a program of instructions executable by a processor for performing a computer-implemented method for selectively displaying content to a user of a social network, comprising:
  maintaining in a computer system for each user of a social network a profile including data on individual preferences and/or interests of the user and significance of each preference and/or interest for the user, at least some of the individual preferences and/or interests being encoded as an interest cloud, the interest cloud including a list of keywords, wherein the list of keywords includes explicit keywords defined by the user and implicit keywords created by the system, each keyword having an attached weighting representing the significance, wherein the interest cloud is stored as a network of keywords of said list of keywords being stored as part of the profile of said user on a central server of said social network, wherein each keyword is linked by a connection to one or more other keywords of the list of keywords to create a context or similarity for the network of keywords;
  setting said list of keywords comprising:
    displaying a graphical representation of said list of keywords on a graphical user interface (GUI) of an electronic device operated by said user, said graphical representation comprising an indication of the significance of said keywords and the connection of said keywords with other keywords included in said list of keywords and a graphical scheme that distinguishes explicit keywords defined by the user, explicit keywords defined by a member of the social network, and implicit keywords suggested by the system based on the user's interest and/or the user's location;
    modifying, by the computer system, the significance and connection of said keywords in response to navigational input data of said user to thereby obtain a modified list of keywords including the keywords and the respective significance and connection associated therewith; and
  storing said modified list of keywords as part of the profile of said user on a central server of said social network;
  providing input data including content;
  receiving a request of said user for displaying content;
  filtering the input data including the content in accordance with the individual preferences and/or interests; and
  selectively displaying the filtered content to said user in response to said request, wherein said filtered content is displayed in accordance with the profile of said user, in accordance with a list of keywords and in accordance with the individual preferences and/or interests of the user.

* * * * *